(12) United States Patent
Choulet

(10) Patent No.: US 7,597,055 B2
(45) Date of Patent: Oct. 6, 2009

(54) AGRICULTURAL MACHINE FOR CROP INTERSEEDING

(76) Inventor: Alberto Oscar Choulet, Colectividad Libanesa No. 127, Rafael Obligado, Partido De Rojas, Provincia de Buenos Aires, 6001 (AR)

( * ) Notice: Subject to any disclaimer, the term of this patent is extended or adjusted under 35 U.S.C. 154(b) by 0 days.

(21) Appl. No.: 12/095,108

(22) PCT Filed: Aug. 10, 2006

(86) PCT No.: PCT/EC2006/000007
§ 371 (c)(1),
(2), (4) Date: May 27, 2008

(87) PCT Pub. No.: WO2007/073742
PCT Pub. Date: Jul. 5, 2007

(65) Prior Publication Data
US 2008/0264312 A1    Oct. 30, 2008

(30) Foreign Application Priority Data
Dec. 29, 2005   (AR) .............................. P050105635

(51) Int. Cl.
*A01B 49/04*  (2006.01)
*A01C 5/00*   (2006.01)
*A01C 7/18*   (2006.01)
*A01C 13/00*  (2006.01)
(52) U.S. Cl. ..................... 111/69; 111/81; 111/140; 111/165; 111/193
(58) Field of Classification Search .................. 111/164, 111/14, 69, 79, 81, 139, 140, 149, 157–195, 111/200, 900
See application file for complete search history.

(56) References Cited

U.S. PATENT DOCUMENTS

| 4,273,057 A | 6/1981 | Pollard |
| 2005/0172872 A1 | 8/2005 | Kaster |

FOREIGN PATENT DOCUMENTS

| DE | 3151581 | 7/1983 |
| ES | 8608776 | 12/1986 |
| ES | 2162033 | 12/2001 |
| ES | 1058932 | 2/2005 |

*Primary Examiner*—Christopher J. Novosad
(74) *Attorney, Agent, or Firm*—Evelyn A. Defillo; Defillo & Associates, Inc

(57) ABSTRACT

An agricultural machine apt for crop interseeding, of the type that is self-propelled, comprising a unit with a drawing drive unit and a draw unit, both operatively linked to each other. The drawing drive unit comprises a land vehicle including an elevated chassis disposed at a substantial height for passing over tall mature crops such as corn, wheat, sunflowers and other similar crops, without causing any damage. The drawn unit comprises a structure mounted on a metal frame of a single hopper housing seeds and/or fertilizers with its corresponding dosage dispensers and mechanically actuated drop chutes. A transversal longitudinal member is positioned over the frame and the lower part thereof is provided with multiple cavities with anchoring guides for housing and positioning a number of modules of independent bodies of planting/fertilizing of easy assembly and disassembly changing the distance between the bodies en discrete y selective form according to the distance between the furrows of the primary mature working crop.

4 Claims, 6 Drawing Sheets

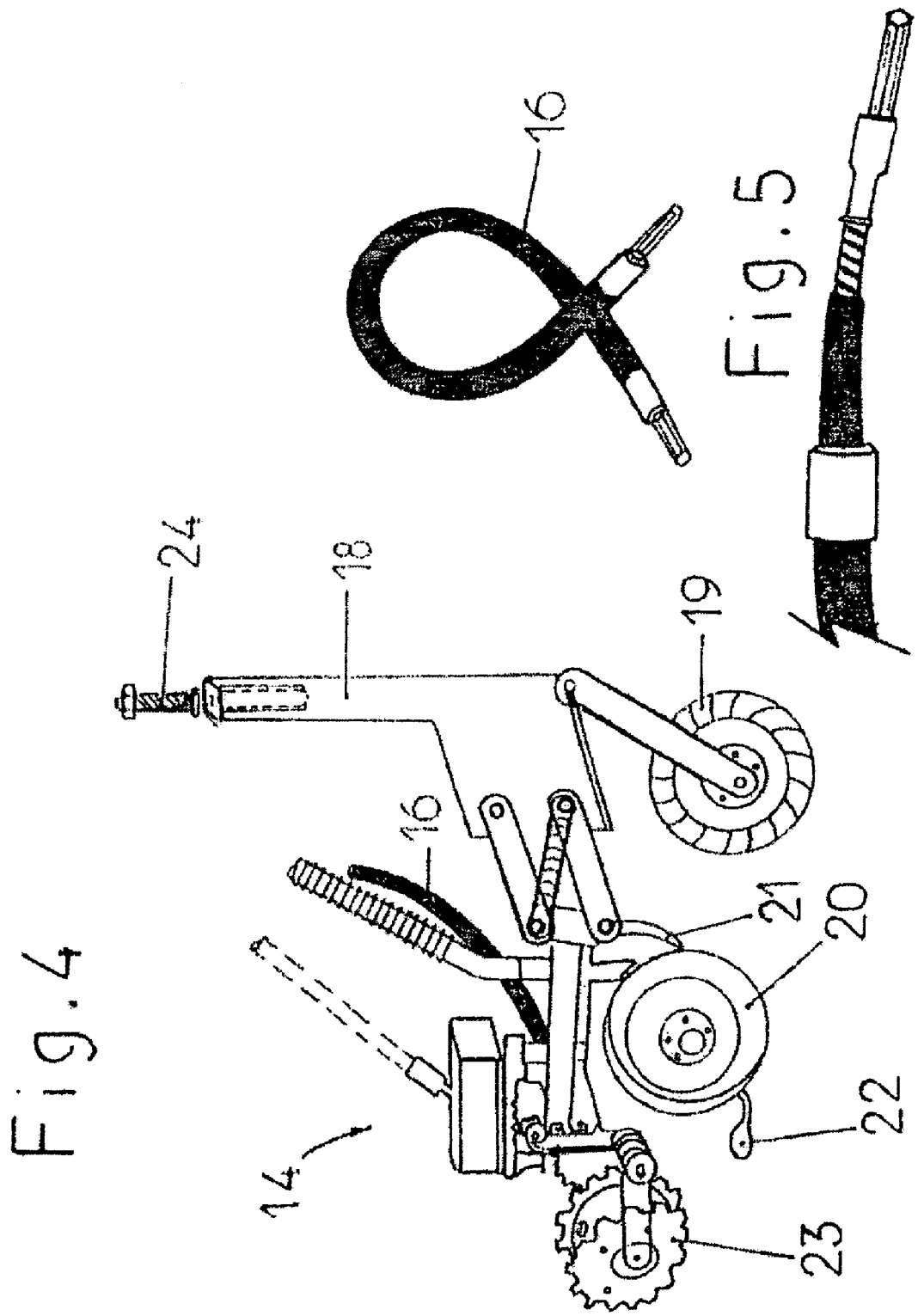

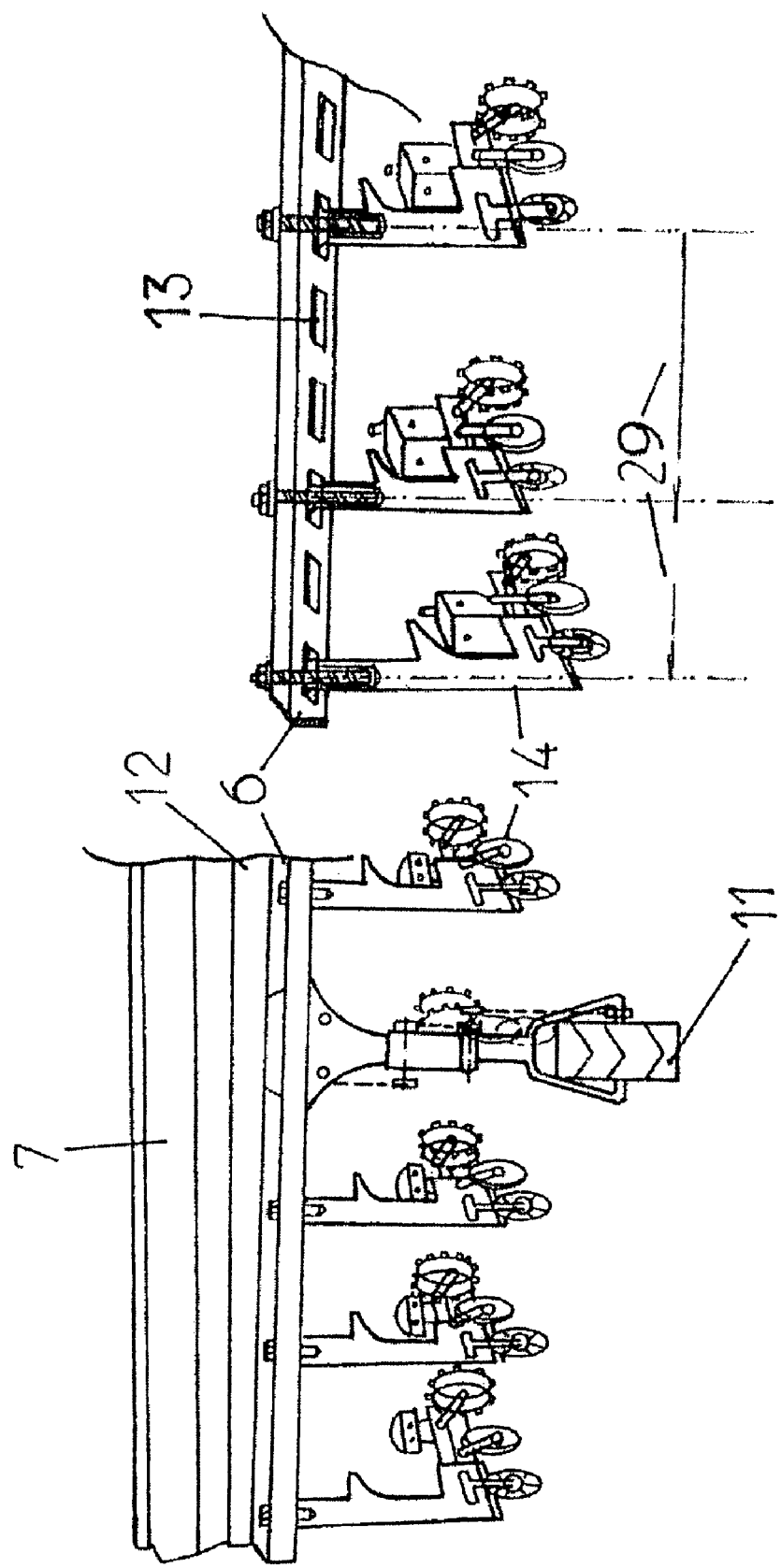

AGRICULTURAL MACHINE FOR CROP INTERSEEDING

CROSS REFERENCE TO RELATED APPLICATION

This application is a national stage entry of PCT/EC2006/000007 filed Aug. 10, 2006, under the International Convention claiming priority over Argentina application No. P20050105635 filed Dec. 29, 2005.

FIELD OF THE INVENTION

The invention relates to an "agricultural machine for crop interseeding", of the type that is self-propelled, which facilitates the implementation of the double crop, increases the efficiency in the catchment of regional incident radiation, and increases the profitability of the farming company.

BACKGROUND OF THE INVENTION

The interseeding is the technique where the sowing of the winter crop is placed intercalate in furrows, allowing sowing of the summer crop (soybean) before the harvest of the winter crop such as wheat, corn, sunflower or another similar crop.

In addition, the interseeding facilitates the implementation of the double crop in the region, since summer crop is sowing in dates near the sowings of the first crop.

This improving technique raises an intermediate alternative between covered sowing and the conventional sowing, because it uses machineries to incorporate the seeds in superficial form or very superficial over the implanted pasture or natural field. The chemical factors are modified-by fertilizer, biologically—via seeds and inoculants—and physically in partial form. As far as the implantation, the interseeding is less risky and can be implanted more quickly than the covering sowings.

The wheat is sown in a diagram of two lines and a calculated space to be able to sow soybean or corn between the furrows before harvesting the soybean.

With this methodology the surface of the ground is maintained and covered most of the year, diminishing most of the hydric erosion in lands with slope. In addition it is necessary to obtain a suitable control of the weeds during the crop.

This one improvement technique is recommended in different situations such as:

a. In zones whose relief allows the use of some types of machinery.
b. In grounds that do not allow conventional farming because its edafe limitations.
c. When it is desired to prolong the life of a cultivated pasture.
d. When pretending to increase the total production of the forage incorporating species of better quality and more resistant to diseases.
e. If it is necessary to improve the nitrogen fixation, incorporating leguminous with selected rizobios.
f. If a good vegetable cover does not exist, to protect the seed from environmental factors—temperature, humidity, etc.—in the implantation.
g. When the amounts of perennial weeds or summer species prevent or reduce the winter grass production.
h. After a drought, fire or overgrazing.
i. When the species losses take place by physical problems of the ground-compaction If the situation is extreme, it would be necessary to use renovated chisels—fine tubes and small blocks or a disc dredge.

The interseeding is not advisable in some cases:

a. In escarped zones with slopes that limit the use of machinery. In this case it is convenient to think about using sowing with an aerial cover.
b. In grounds with great drainage problems.
c. If the surface is very uneven, it is more convenient to use a double superficial disc.
d. If a mixed diagram is found—agricultural-cattle, to evaluate very carefully the economic benefit of the interseeding: it can result in more income-production to incorporate the field to the agricultural cycle.

Advantages speeds the works because it requires little personal and Horse Power.
maintains the vegetal cover, diminishing the loss of humidity.
protects the ground erosion.
optimizes the implantation moment.
pasture can be anticipated because of the firm floor.
reduces costs.

State of the Technique and Elements to Consider

Tools

There are several alternatives that have being presented; in the last years an interseeding that simplifies the tasks (by the different incorporations allowed) have been imported and developed at a national level, in addition to improving the implantation system.

A good interseeding machine is one that:

a. carries out a good bed of sowing.
b. sows accurately and with a good control of dose and depth.
c. does not damage the grain.
d. fertilizes in located form.

Also the accumulated experiences in the use of total herbicides or desiccants, allows diminishing the competition of the platform to improve; giving greater security to the first stage of the process of the interseedings.

We will classify the above according to the amount of used implements and intensity of removal of the ground.

1. Direct sowing
   With minimum removal: interseeding machine with discs.
2. Interseeding
   With partial or total removal in the band:
   Integral work
   Interseeding machine to block in U form or inverted T.
   Interseeding machine to rotors
   Separated tasks
   Disc dray with drawer
   Sowing machine+covered fertilizing machine
   scarifier chisel (superficial 3 cm)
   seeding drawer+covered fertilizing machine
3. Reduced farming
   With total removal:
   Chisel+disc dray+sowing machine+fertilizing machine
   Double disc dray+sowing machine+fertilizing machine
   1. Direct Sowing
   Disk interseeding machine: (Agrometal John Deere, Truax, Bertini, etc.)

Works over the platform opening a furrow that has the width of the disc. It is not our intention to make a description of the different models; only the general characteristics will be mentioned.

There are chassis that support 2 drawers for seeds and fertilizers (in some cases they have 2 drawers of seeds for grass and leguminous) that ends at a double disc set where 2 unloading tubes have being leaned.

The majority of the brand names incorporate the seeds and fertilizers in the same band with the limitations or risks that it causes.

Others with different devices (inclined or straight discs) apply the fertilizers underneath or to the flank and underneath the furrow of the sow.

All come with cutting discs in front of the double discs, with different drawings to facilitate the entrance of the sow organs; there are even brand names that allow annexing indented discs in front of the cutters to open the stubble, facilitating the sowing.

In general, these sowing machines have more weight than the conventional ones, assuring their penetration with 3 springs that press against the ground and can be used or not, according to the stubble.

According to the situation, it will be possible to recommend annexing the sowing machine to a chain dray or worn out teeth.

I. Interseeding Machine to Rotors

Makes the integral work and has all the necessary accessories to make a good sow.

The difference with the previous one is in the replacement of the double discs by a package of rotors that remove the ground in a width of 5 cm and up to 10 cm of depth. In main lines we affirmed that the sowing bed that prepares this type of interseeding is superior to the previous ones, but it has another type of disadvantage that moves it away from optimal working (See Table No. 1).

TABLE 1

Differences of the interseedings machine

| Rotor | Discs |
|---|---|
| 1. Removes a lot of ground. | It has more dependency of the pre-sowing herbicide. |
| 2. Has less dependency of herbicide because it removes the vegetation in the furrow. | It has more initial competition. |
| 3. Has less initial competition. | Minimum growing of annual weeds. |
| 4. Produces greater growing of annual weeds. | Minor loss of old plants. |
| 5. Greater loss of old plants. | Minor dependency of post-sowing herbicides. |
| 6. Greater dependency of post sowing herbicides. | Work can be started with more superficial humidity, but when this one is reduced it is necessary to finish before. |
| 7. Must begin working later by the superficial humidity but it can continue working when the humidity is reduced. | More speed of advance; less HP to work. Minimum maintenance cost. Greater work width. |
| 8. Less advance speed and more HP to work. | |
| 9. Greater maintenance cost. | |
| 10. Smaller work width. | |

II. Interseeding Machine to Block (Grassland)

It works over the platform opening a furrow of 5 cm width and 3 cm depth. It consists of a frame with 7 to 9 chisels to 30 cm between each other provided with a block of a triangle form and a hydrostatic depth-control gear. The machine completes with 2 drawers, one for fertilizers and another for seeds.

It is not advisable to sow mixtures of grass and leguminous. In Argentina this method was only used to incorporate the leguminous, although some implanted scallions. The perennial forages failed in great proportion.

This type of interseeding machine has some problems with respect to the previous:

The compaction made by block in the furrow diminishes the initial rooting.

By the type of open furrow less light enters, making the initial growth slower.

It has little work width and greater distance between furrows.

When there are strong rains, the furrow fills with water with the consequences that this brings. Nevertheless, in dry periods it conserves more humidity.

It must have greater certainty in the control of the advance speed because when diminishing it the earth bread does not overturn and falls on the removed furrow covering the seed.

III. Interseeding Machine of Block-Seedmatic (Atchinson) New Zelandia

It differs from the Grassland in:

It has vibratory arcs that join the rudders, doing the work more tediously than the conventional block.

1. The blocks Baker, (inverted T form) leave a fine furrow in surface and enlarged in the base conserving more of the humidity than the Grassland or any one of those of disc or rotors. Allows working more time and expanding the sow time. In addition, avoids the incorporation of straw to the furrow, which prevents the contact of the seed with the ground, limiting the germination.

2. It has a greater amount of sowing furrows (2.50-3 mts width of work with rudders to 15 cm), depositing the fertilizer underneath of the seed and this one is mixed with a sowing bed looser than the sowing machine that makes furrow in a "V" or "U" shape.

3. In case of strong rains, by the type of block, less water enters in the furrow and in addition diminishes the damage that can produce the direct hit of the drops of rain.

4. It has a kit of cutting discs facilitating the work of the land block with residues or gramona.

5. It has a feeder with a sponge that allows sowing any type of seed without breaking it, without affecting the vibration, and of easy cleaning.

IV. Interseeding with Disc Dray

It is made by heavy disc dray without lock, marking the furrow with its weight.

The depth of the work must be of 2 cm and the width of the furrow is in intimate relation with the thickness of the disc. It is very important that the unloading tube of the seeds has a length that allows taking the greater amount of sufficient seeds to the base of the disc, but not so long that it can be mixed with the soil and be covered.

Due to this, there will be a percentage of seeds that will be distributed in the hedge without covering. If to this we added the lack of regulation in the depth and its greater untidiness is essential to increase the density of sowing.

It is possible to think that this system of implantation will better adapt to the annual leguminous (less alfalfa) and annual grasses.

For the work to be more efficient it has to be coupled to the disc dray, a press roller and/or teeth dray, or in their defect, to draze with high loads (10 head/ha) during 1 to 3 days. It is always recommended to fertilize 10 to 15 days before sowing.

V. Interseeding with Scarifier Chisels

Just as the previous, only the implementation is modified and is called scarifier because the chisels work in surface over the horizon.

3. Reduced Farming

Here all the factors are modified: chemicals (fertilizers), biological (seeds or inoculants) and physicals (ground, aeration, porosity, etc).

In this farming, the superficial vegetation is removed with different implements without reversing the soil plan to later make a conventional sowing.

It is advisable:
a. When a superficial ground exists and the reversing of the soil plan is pernicious.
b. When there is excessive ground compaction, limiting the oxygenation, absorption of nutrients, etc.
c. It is desired to take advantage of the accumulated fertilizer (5 cm).
d. When the prairie was thinning by attack of white worm.

At the present time, crops are made respecting the times and harvests, one after another, although there have been several attempts to invent reforms that allow to advance a sowing without having harvested the previous crop. Until now they have been impractical and generally used in a single crop, for example wheat and soybean.

The soybean has the critical period at moments, very different from the one from wheat, corn and sunflower. The interseeding of crops can be a useful tool, although we did not find jobs of interseeding that are based on separating the critical periods of the crops and the structures of sowing, as the specialists said.

The tractor wheels in a traditional interseeding with soybean, step on rows of wheat, corn, sunflower or similar crops and therefore, it is generally not sowing.

There exists, in state of the art techniques, diverse machines/systems for the interseeding of crops, published in patent documents that deserve to be mentioned by their importance, which we can mention:

The publication of application AR 040671 A1, discloses a automotive interseeding machine that allows to sow soybean in wheat crops before its harvest, having the particularity of being self-propelled, and having a sowing train, with great clears and narrow wheels, allows, unlike the traditional interseeding, to sow all the rows of preceding wheat without diminishing the potential yield.

The disadvantage of this machine is that it has operative limitations of labor work as much in the width as in the height, for example, the distances between furrows are 52 cm, and the sowed wheat to 26 cm and when the wheat is not sowed correctly, like when the distances are inferior to 26 cm, in some or all the lines, when sowing the soybean some of the wheels of the sowing machine step on the wheat, in addition when the crop (wheat, corn, sunflower, and others) is in the developed state to more than 1 meter of height, diminishes the yield potential because this machine deteriorates the crop previously sowed.

The publication of the Argentinean Patent AR 201,522, discloses an interseeding machine that includes a frame, having a plurality of blades carrier arms and link to at least some of the remaining cross-sectional members a plurality of sowing blocks, being the lifting cross-sectional members of these blocks after the last lifting cross-sectional member of these arms with the cutting blades; being each one of these arms and these blocks, in its respective cross-sectional members, link to it by individual subjection means the height regulation of the held element; having at the same time each cross-sectional member a plurality of this subjection means to itself and regularly spaced, so that the subjection means of a posterior cross-sectional member are located in half of the distance between two consecutive subjection means of previous cross-sectional member, being then the linking means of each cross-sectional member alternated aligned inwardly according to the advance direction of the machine; being the mentioned unloading tubes of the deposits disposed immediately behind each seeding block.

The publication of Argentinean Patent No. AR 000149B1, discloses an interseeding machine of drag, particularly an implantation machine of valuable forages species and difficult to seed and preferred destined to carry out the sowing-interseeding, in indistinct form, in implanted crops to improve such or directly in natural pasture to enrich them with certain species, the machine is of the type that includes a chassis with the hydraulic lifting and it is characterized for having a dispenser for the seeds, constituted by at least a pair of cross-sectional aligned hoppers with its three internal systems of removal of seeding material and by the fixed hoppers that externally, together with the corresponding chassis supports, conform the protection means of the distribution of the seeds and the respective rotating hoppers.

The disadvantage of these previous machines is that they have operative work labor limitations in the width between the furrows and as well as the height, and occupying 100% of the crop ground, with displacement direction in the free spaces between the lines of the crops in developed state, preferably to more than 1 meter, allowing to make the work under the direct and regular sowing method with a system of distances change between the furrows according to the working crop with the purpose of intercalating the summer crop, as for example, soybean between the lines of wheat, corn, sunflower or of similar winter crop, obtaining the crop implantation in times superposed of different crops.

SUMMARY OF THE INVENTION

Departing from the present state and the previous art of the mentioned technique, the concrete objective of the invention is based on an agricultural machine that allows very good sowing quality, identical to the present existing sowings machine in the market, also to make the fertilization in a very ample range of crops, with different width between working furrows (35 to 70 cm) and a determined height in combination with the tractor part in order to obtain the minimum damage and deterioration in the seeded crop.

The sowing of simultaneous crops on a same surface is an option that allows increasing the capture and efficiency of use of the resources and the annual productivity of the ground. Within the options of simultaneous summer crops that are actually of great interest can be found the intercrop of Corn-Soybean and Sunflower-Soybean and the crop in strips of Corn-Soybean and Wheat-Soybean. The success of these practices is based on taking advantage of temporary de-phasing in the critical periods of the crops. From the liberation of corns with resistance to glyphosate and of the resistant sunflowers to imidazolinones the handling of the weeds in simultaneous form is simplified.

Furthermore, in addition to the preceding characteristics also includes in the drive unit of an agrochemical application unit for applying selective herbicides to the weeds of the crops at the moment at required forms, obtaining therefore simultaneous work (seeding, fertilizing and fumigating).

Also being considered in its design, is one long utility life and low maintenance cost, as well as the simple replacement in cases of emergency by faults or failures.

The following pictures show primary crops such as sunflower and corn with interseeding over the same working surface.

Picture 1: Sunflower with soybean interseeding
Picture 2: A lot with corn-soybean interseeding.

Today, for example, while the consumption technologies continue contributing solutions for the crops, in humid Pampas they are multiplied diverse experiences that aim to a mixture of rentability-sustainability through already well-known techniques in the wheat fields of south Buenos Aires: the interseeding of a crop with another one in development.

However, unlike that which started to happen in several parts of the southeast and the southwest of the province of Buenos Aires, in the central region of the humid Pampas the tendency is by more, with two modalities for the interseeding in the lot: corn-soybean and sunflower-soybean. Only in the case of the interseeding corn-soybean, producers and technicians observed a double benefit, with the cereal contributing with the organic matter and to the ground structure and the soybean doing more viable the inclusion of the corn from the economic point of view. In addition, the interseeding sunflower-soybean looks to diversify the risks and to make more efficient the use of the resources, besides increasing the physical productivity by hectare.

The idea is to take advantage of the aspect that stands out in each crop: of the soybean, the yield, and the corn, the contribution to the system.

BRIEF DESCRIPTION OF THE DRAWINGS

The invention will be next described in reference to the accomplishments shown in the accompanying drawings.

FIG. 4, is a view of the constituent parts of the module of a planting and/or fertilizing body.

FIG. 5, is a view of the control of flexible transmission.

FIG. 6, is a view of the metallic frame, reflecting the different cavities to position the different planting and/or fertilizing bodies allowing varying the passage of work between furrow, according to the primary crop.

DETAILED DESCRIPTION OF THE INVENTION

Figure 1:
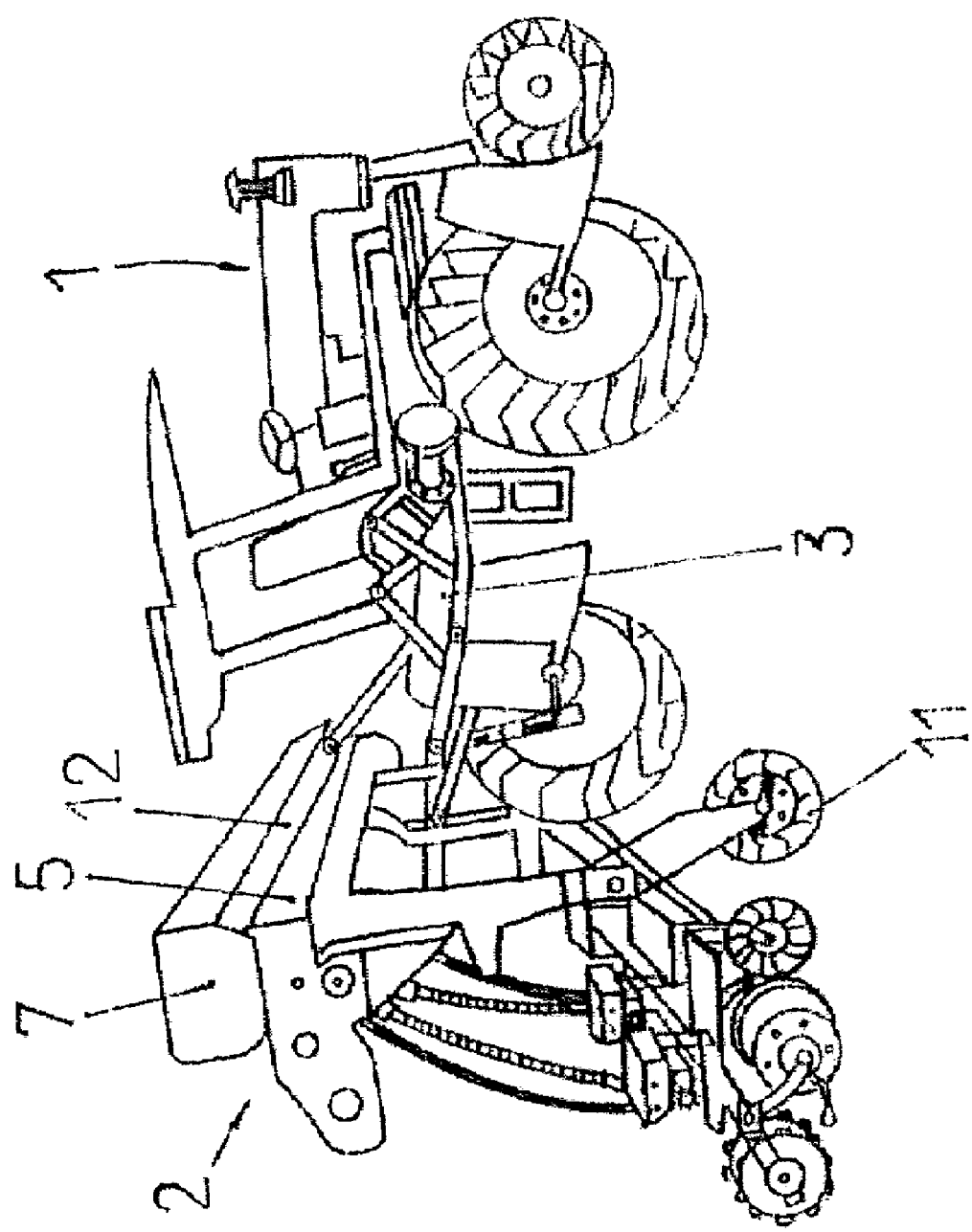
FIG. 1, is a schematic view of the agricultural machine, in order to observe the fundamental parts that contain the structure of the same.
Figure 2:
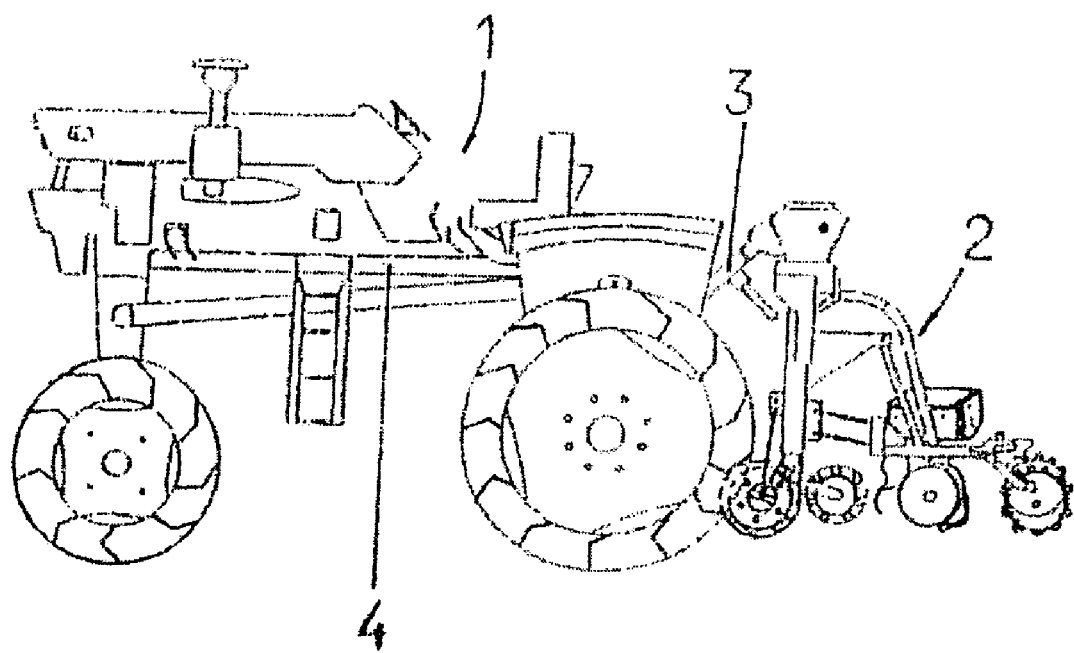
FIG. 2, is a lateral view of the agricultural machine.
Figure 3:
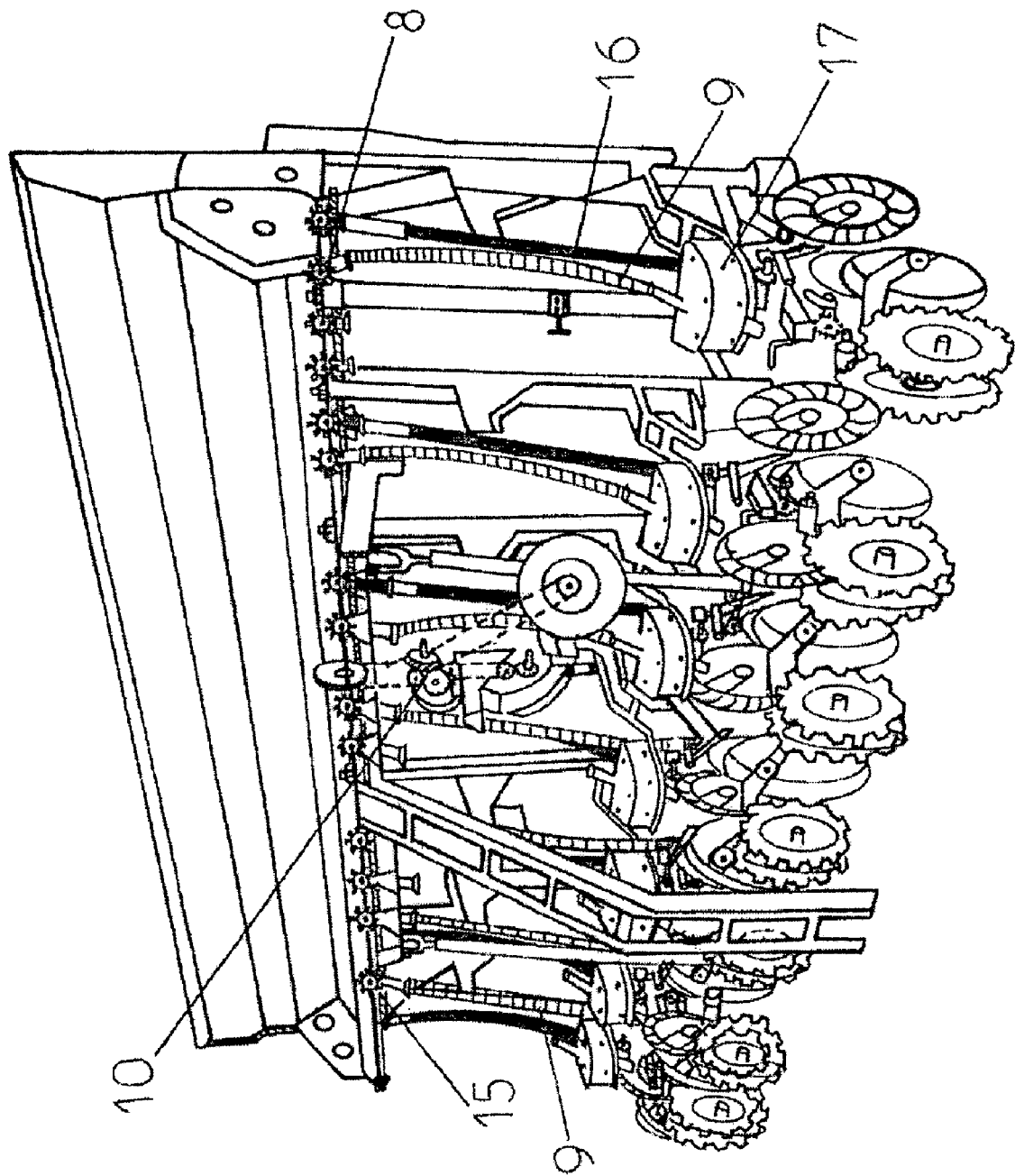
FIG. 3, is a back view of the machine showing the drag unit with the independent modules of sower/fertilizer bodies in transportation position allowing changing the width of work task according to the amount of connected modules.
Figure 7:
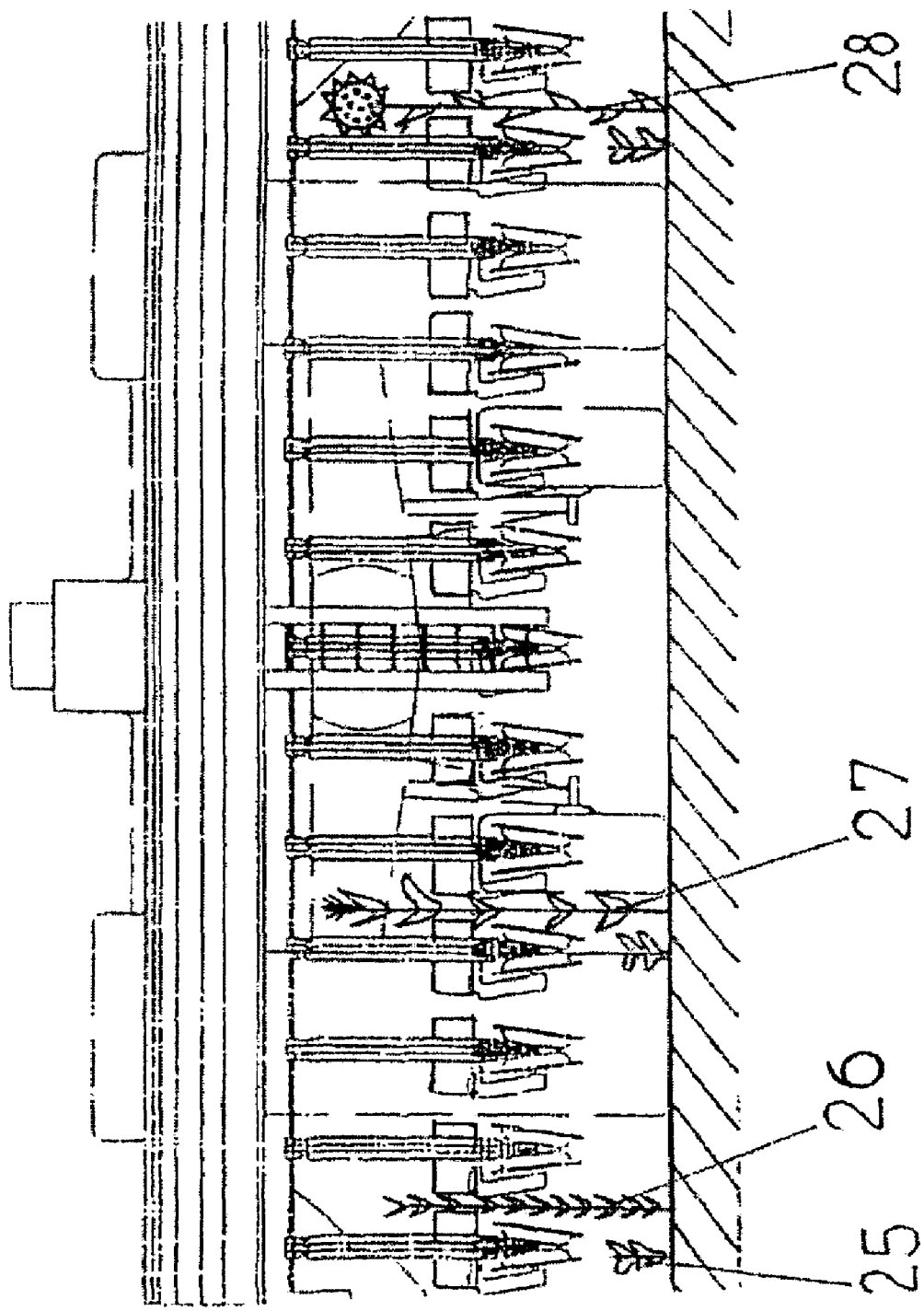
FIG. 7, is a back view, where it is possible to appreciate the lines of crop association sowing, by where the bodies of sowing and/or fertilization and the driving wheels move.

According to FIGS. 1-7, the characteristic elements that conform to the Agricultural machine are:
1. Drawing drive unit
2. Draw unit
3. Mechanical coupling with hydraulic drive
4. Over-elevated chassis body
5. Metallic frame
6. transversal stringer
7. Single hopper of seed and/or fertilizer containment
8. Trickle dispensers of the Chevron type
9. Drop chute of seeds and/or fertilizer of corrugated rubber material.
10. Gear train with transmission chains
11. Independent control wheel of the draw unit
12. Metallic cradle to support the single hopper
13. Cavities with anchorage guides
14. Planting and/or fertilizing bodies
15. Hexagonal gimbal bar
16. Flexible transmission control with hexagonal form
17. Deposit with mechanical distributor of horizontal plate
18. Slope rudder of the seeding and/or fertilizing body with threaded internal cavity.
19. Cutting blade
20. Open-furrow double disc for sowing machine with depth leveler wheels.
21. Protection nail of the open-furrow double disc sowing machine
22. Fixed tongue for seed to avoid the bounce in bottom of the furrow
23. Double ridge grader wheel
24. Bolt and washer of anchorage to fix the seeding and/or fertilizing bodies.
25. Secondary soybean crop
26. Primary developed wheat crop
27. Primary developed corn crop
28. Primary developed sunflower crop
29. Variable pass between the seeding bodies and/or fertilizers with its representative axis define by stroke and point.

DESCRIPTION AND PRINCIPLE OF OPERATION

Reference will be made to all the figures, to describe the invention, in which is provided with a drawing drive unit (1) and a drawn unit (2) which are operationally interconnected by means of a mechanical coupling (3) that can be lifted hydraulically; the drawing unit (1) comprises a land vehicle, which strongly adheres to the soil, including an elevated chassis (4) which is disposed at a substantial height such that it can pass over tall mature crops (preferably more than 1 meter on height), such as corn, wheat, sunflowers and other similar crops, without causing any damage; the drawn unit comprises a considerably-tall, wide structure which is mounted on a metal frame (5) bearing a single hopper (7) housing seeds and/or fertilizers and including corresponding mechanically-actuated dispensers (8) and drop chutes (9) which are controlled using a gear train (10) and an independent control wheel (11) which is in contact with the soil, thereby defining the operating position; a transversal member (6) is positioned over the above-mentioned frame (5) and the lower part thereof is provided with multiple cavities with anchoring guides (13) for housing and positioning a number of modules of independent bodies belonging to planting/fertilizing bodies (14) which are kinematically associated with a hexagonal gimbal bar (15), disposed along the length of the gauge of the unit, and to a mechanism comprising individual flexible transmission controls (16) for actuating a mechanical horizontal plate distributor, which is disposed inside the container (17) housing the seeds and/or fertilizer; having direction of displacement in the free spaces between rows of mature crops, such that the cultivation can be performed by means of the method of direct seeding and having direction of displacement in the free spaces between the lines of mature crops allowing to perform the work under the method of direct sowing and to regulate the passage between the bodies according to the distance between the rows of the working mature crop with the purpose of intercalating the sow of a summer secondary crop such as soybean between the rows of wheat, maize, sunflower or similar winter crops, obtaining a technical effect of coexistence of the crops in times superposed of different crops in simultaneous form and associate on the same work surface with the purpose of increasing the physical productivity by hectare (with two cultures associated in a same cycle and ground).

The basic principle of operation consists to arrange in the single hopper of seeds and/or fertilizer of containment with its corresponding dosage type dispensers (CHEVRON) a mechanical drive of an associated gimballing bar to a train mechanism linked by means of a transmission to a gear located in the independent wheel of command drawing drive unit, when this wheel is in contact with the ground, the mechanism begins to work allowing the circulation of seeds and/or fertilizer by the dropping tubes corresponding to each seeding and/or fertilizer module, made the particular tasks according to the working crop.

The following characteristics stand out in addition, to be considered:

The assembly of the independent modules of the seeding and/or fertilizer bodies (14) is connected in the cavities with guides (13) with subjection means (24), preferably bolt and washer of easy assembly and disassembling, varying the passage between the bodies in discreet and selective form according to the distance between the rows of the mature working crop.

The work in independent form such as sowing or fertilizing, and also the work in simultaneous form to seed and to fertilize working crops.

According to all the previously exposed and illustrated, it is easy to understand the advantages of practical order that offers the agricultural machine apt for interseedings of crops, therefore the annexed claims cover the reach with the invention.

The invention claimed is:

1. A self-propelled agricultural machine for crop interseeding comprising:

a unit with a drawing drive unit and a draw unit, wherein the drawing drive unit and the draw unit are operatively linked to each other by a mechanical coupling with a hydraulic drive of elevation;

wherein the drawing drive unit comprises a land vehicle, which adheres to the soil, including an elevated chassis disposed at a substantial height, such that it can pass over the crops without causing any damage;

wherein the drawn unit comprises a structure mounted on a metal frame bearing a single hopper housing at least one of seeds and fertilizers and including corresponding mechanically-actuated dispensers and drop chutes which are controlled using a gear train and an independent control wheel which is in contact with the soil, thereby defining the operating position;

wherein the frame has a top end, and a bottom end;

wherein a transversal longitudinal member is positioned at the top of the frame and multiple cavities having anchoring guides are positioned at the bottom end of the frame;

wherein the multiple cavities house and position a number of modules belonging to planting/fertilizing independent bodies to the anchoring guides by subjection means for easy assembly and disassembly, varying the distance between furrows in discreet and selective form according to the crop;

wherein the distance between the bodies is changed depending on the distance between the furrows of the crop, and wherein the independent bodies are kinematically associated with a hexagonal gimbal bar disposed along the length of a gauge of the unit and to a mechanism comprising an individual flexible transmission control for actuating a mechanical horizontal plate distributor, which is disposed inside the hopper housing at least one of seeds and fertilizer;

wherein the individual flexible transmission control has a direction of displacement in the free spaces between furrows of the crops, wherein a distance between the bodies is allowed to be regulated according to the distance between the furrows of the crop to intercalate a second crop between the rows of the crop.

2. The agricultural machine apt for crop interseeding according to claim 1, wherein the distance between the furrows of the crop is between 35 to 70 cm.

3. The agricultural machine apt for crop interseeding, according to claim 2, wherein the crops are more than 1 meter in height.

4. The agricultural machine apt for crop interseeding, according to claim 1, wherein the subjection means are a bolt-washer system.

* * * * *